United States Patent [19]

Gillette

[11] 4,087,990

[45] May 9, 1978

[54] TRANSMITTING TORQUE

[75] Inventor: Willard D. Gillette, Topsham, Me.

[73] Assignee: Zephyr Wind Dynamo Company, Brunswick, Me.

[21] Appl. No.: 759,733

[22] Filed: Jan. 17, 1977

[51] Int. Cl.² ............................. F16C 1/02; F03D 9/00
[52] U.S. Cl. .................................... 64/2 P; 64/17 SP; 290/55
[58] Field of Search ......................... 64/2 P, 17 SP, 12; 290/55, 44

[56] References Cited

U.S. PATENT DOCUMENTS

| 2,501,217 | 3/1950 | Hawn | 64/2 P |
| 3,618,339 | 11/1971 | Chisholm | 64/12 |

FOREIGN PATENT DOCUMENTS 238,223  9/1911  Germany.

Primary Examiner—Milton S. Mehr
Attorney, Agent, or Firm—W. R. Hulbert

[57] ABSTRACT

A torque transmitting structure extends along an axis and comprises a plurality of links connected end-to-end. Each link comprises a rigid spar transverse to the axis situated at one end of the link, a second rigid spar transverse to the axis and skew to the first spar situated at the other end of the link, and four connecting ties connecting the ends of these spars, thereby to form a link of generally tetrahedral form, the spars being common to adjacent links. The connection between spars and ties permit relative rotation therebetween. At least two of the ties in each link are bendable to permit their ends to be juxtaposed, these two ties occupying opposite edges of each tetrahedral link. The structure thus forms an optionally modular collapsible chain which, when extended along its axis, is flexible in bending but torsionally rigid.

In one embodiment the ties of each link are flexible and formed in a continuous ring with equally spaced loops along the ring, the spars having hooks at their ends for engaging these loops; wind driven sails are attachable to spars to apply torque to the structure which in turn drives an electric generator.

In another embodiment two opposing ties in each link are rigid and capable of supporting compressional loads, arranged so that in successive links they lie end-to-end along two generally helical lines providing a chain which, under torsion applied in one direction, is both self-sustaining and rigid, though flexible in bending, but otherwise non self-sustaining.

13 Claims, 6 Drawing Figures

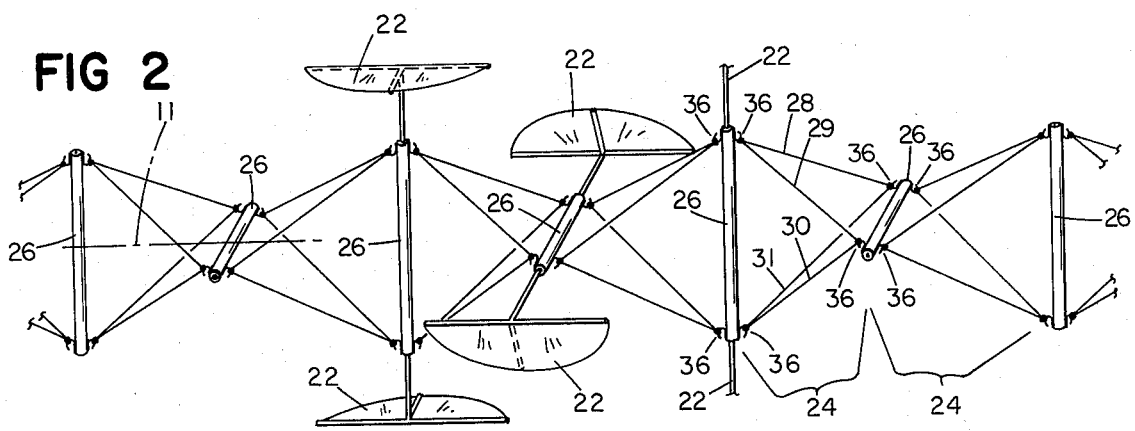
FIG 2
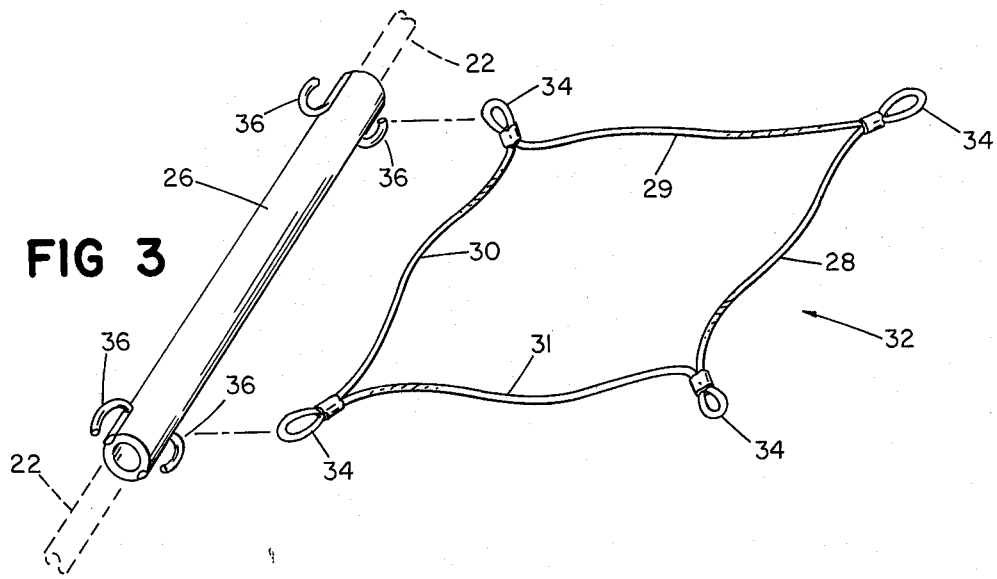
FIG 3
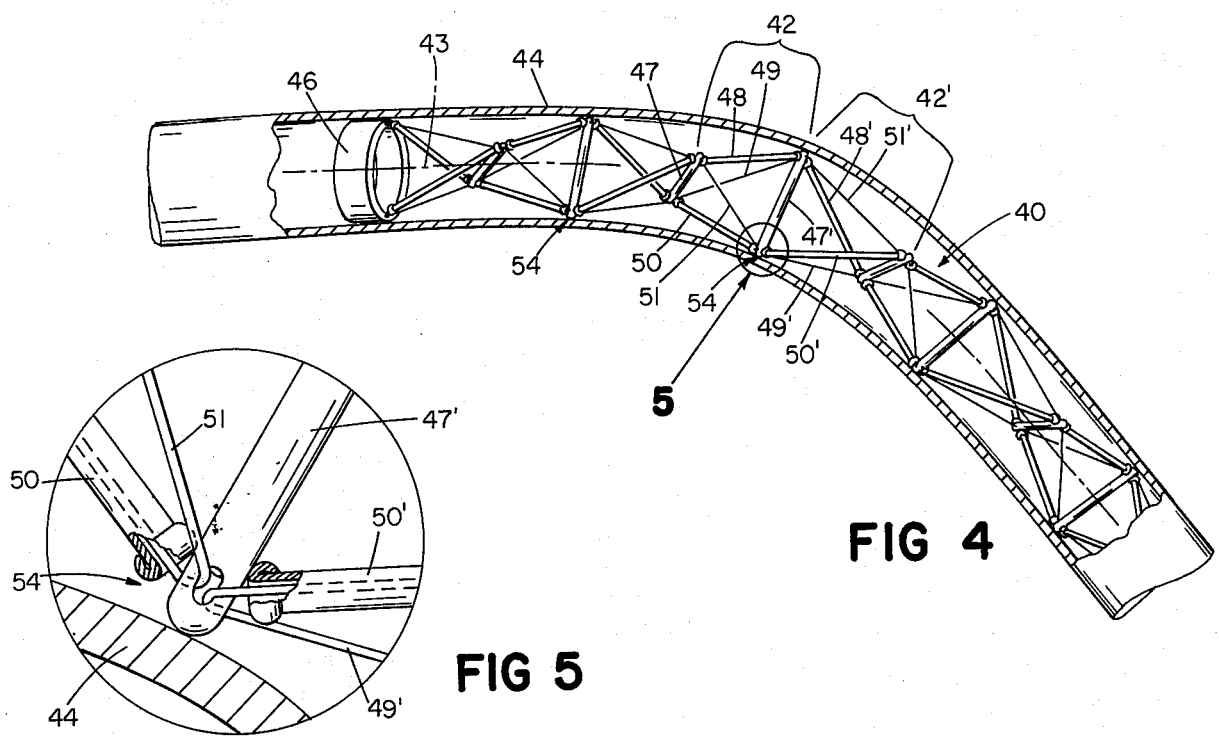
FIG 4
FIG 5

TRANSMITTING TORQUE

BACKGROUND OF THE INVENTION

This invention relates to transmitting torque.

SUMMARY OF THE INVENTION

It is an object of the invention to provide a lightweight torque transmitting structure which is flexible in bending but rigid in torsion and which can be folded compactly for storing or transporting.

The invention features a structure extending along an axis and adapted to receive and deliver torque therefrom, the structure comprising a plurality of links connected end-to-end along the axis, each link comprising a rigid spar transverse to the axis situated at one end of the link, a second rigid spar transverse to the axis and skew to the first spar situated at the other end of the link, and four connecting ties connecting the ends of these spars, the two spars and four connecting ties forming a link of generally tetrahedral form with the spars being common to adjacent links. The spars and connecting ties are connected through linkages permitting relative rotation therebetween, and at least two of the connecting ties in each link are bendable to permit their ends to be juxtaposed, these two ties occupying opposite edges of each tetrahedral link. The structure thus forms a chain which is both flexible and torsionally rigid when extended along its axis and collapsible to a compact form.

Embodiments of the invention additionally feature flexible elements capable of supporting tension forces only for all the ties; ties at least as long as the spars as measured between points of mutual connection; means for sustaining in the chain of a tension of at least $4(T/s)\sqrt{(a/s)^2 - \frac{1}{3}}$ where $a$ is the common length of the ties, $s$ is the length of the spars, and $T$ is the maximum operating torque of the chain; a modular construction, the ties of each link formed in a continuous ring with equally spaced loops along the ring, the spars having hooks at their ends for engaging these loops; and sails attached to the spars to turn the structure in the wind.

Other embodiments additionally feature a structure in which two of the connecting ties are rigid and capable of supporting compressional loads, these rigid connecting ties occupying opposite edges in each tetrahedral link and arranged so that in successive links along the chain they lie end-to-end along two generally helical lines winding along the length of the structure, thereby providing a chain which when twisted in one sense is torsionally rigid, though flexible in bending, but collapsible when twisted in the opposite sense; such embodiment may include means for guiding the chain into bent configuration or to sustain it in tension along its axis in operation.

BRIEF DESCRIPTION OF THE DRAWING

FIG. 2 shows in greater detail the torque chain in FIG. 1.

FIG. 3 shows components used to make the torque chain of FIG. 1.

FIG. 4 shows an alternative embodiment of the invention used to drive a tool within a pipe.

FIG. 5 is a detail on an enlarged scale of one of the joints of the embodiment of FIG. 4.

DESCRIPTION OF PREFERRED EMBODIMENT

Figures 1, 6:
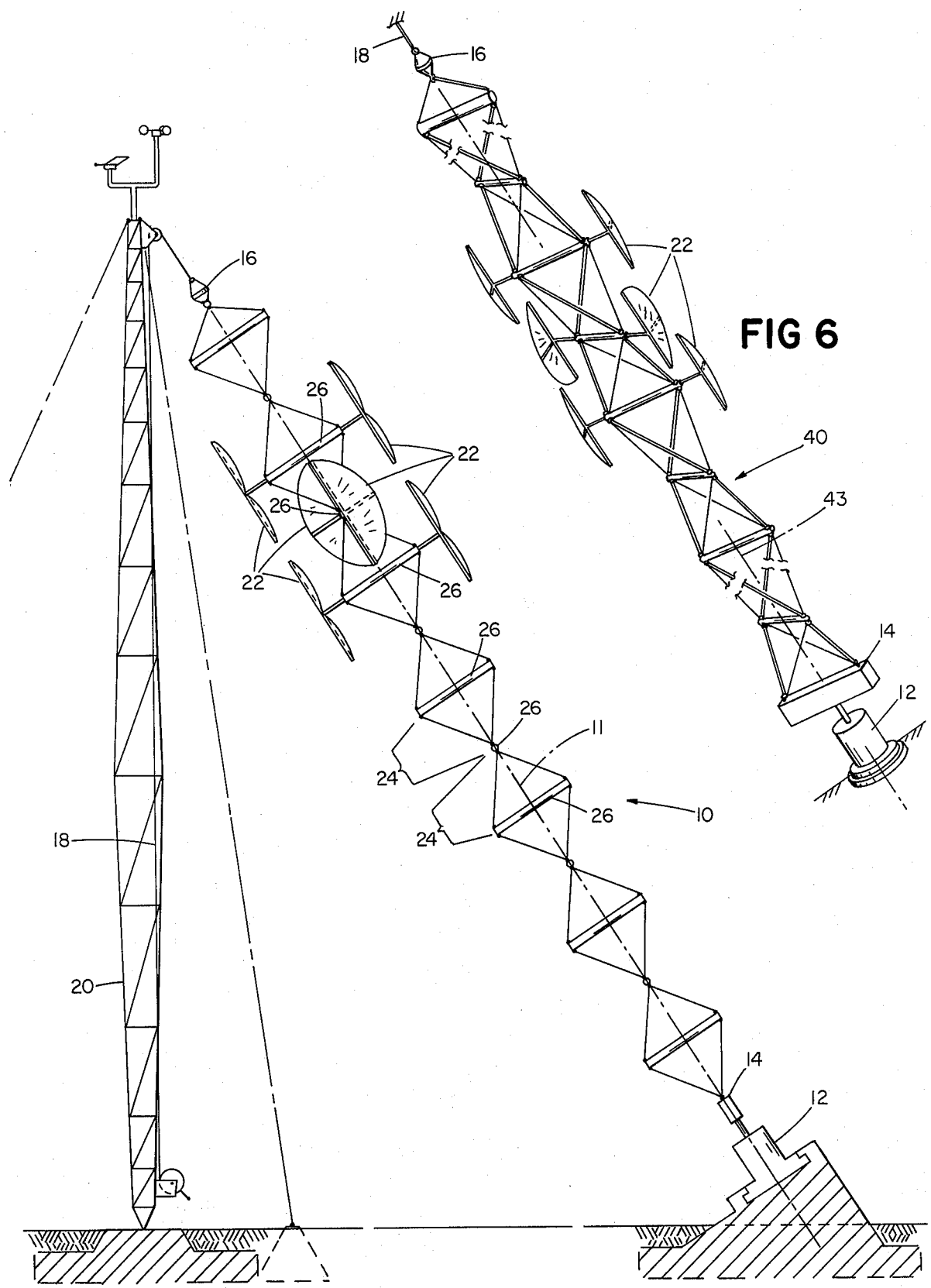
FIG. 1 shows a wind driven electric generator installation employing a torque chain according to the invention.
FIG. 6 is a view of a portion of an embodiment similar to that of FIG. 4 stretched on a linear axis and usable for the same purpose as the embodiment of FIG. 1.

In FIG. 1 torque chain 10, according to the invention, is shown extended along axis 11 and connected at one end to generator 12 through coupling 14. The other end of torque chain 10 is supported through swivel 16 by halyard 18 and mast 20. Sails 22 are affixed to torque chain 10 along its upper end and apply torque thereto in the wind.

Torque chain 10 comprises a plurality of links 24 connected end-to-end along axis 11 as shown in more detail in FIG. 2. Each link has the general form of a tetrahedron made up of two rigid spars 26 positioned to be skew to each other and perpendicular to axis 11 and four connecting ties 28, 29, 30, and 31 connecting the ends of spars 26. The links are advantageously made in a modular form, as shown in FIG. 3, the spars 26 being made of rigid stock, which may be hollow, and having hooks 36 affixed at each end. The ties 28, 29, 30, 31 are advantageously made in groups of four by a rope or other flexible material supporting tension forces only in the form of a continuous ring 32 having four loops 34 spaced preferably but not necessarily equally around the ring, the loops defining the ends of the individual ties 28, 29, 30, 31 and engaging hooks 36 to provide a linkage permitting relative rotation when the apparatus is assembled. The length of the ties as measured between the loops 34 is preferably at least as great as the length of the spars as measured between hooks 36 to facilitate folding of the chain as will be further described hereafter. Sails 22 are advantageously affixed to the ends of spars 26.

In operation, the lower end of torque chain 10 is attached to coupling 14 affixed to the drive shaft of generator 12 and the upper end of torque chain 10 is hoisted aloft by means of halyard 18 running up mast 20. With torque chain 10 in its raised position, ties 28, 29, 30, 31 in each link are extended so that each link forms a tetrahedron as shown in FIG. 2. The wind acting on sails 22 generates a torque applied about the axis 11 of the chain, which is transmitted to coupling 14 to turn generator 12. This torque applied to the chain by the sails induces a reactive tension in the chain 10 acting along axis 11 which is sustained by halyard 18. The magnitude of this reactive tension depends on the torque and the dimensions of the spars and ties and is given by the expression $4(T/s)\sqrt{(a/s)^2 - \frac{1}{3}}$, where $T$ is the applied torque, $s$ is the length of the spars, and $a$ is the length of the ties. The halyard, mast, and other structural elements must be designed to sustain at least this tension force in the chain.

When desired, chain 10 can be lowered from mast 20 and folded into a compact form with all the spars 26 lying alongside each other for storage or movement to another site.

At alternative embodiment of the invention is shown in FIG. 4. Here a torque chain 40 also comprising links 42, connected end-to-end along axis 43 is shown within a curved pipe 44 where it drives a tool 46 in a place not easily accessible. A representative link 42 is formed by spar 47 and ties 48, 49, 50 51 in a generally tetrahedral shape as described above, the ties preferably having a length equal to the spars. Two of the ties 49 and 51 lying on opposite edges of the link tetrahedron are made of bendable material, such as rope, permitting their ends to be juxtaposed by bending. The remaining ties in each tetrahedral link (namely 48 and 50) are rigid and capable of supporting compressional loads. The corresponding elements of link 42' adjacent to link 42 are shown with corresponding primed numbers. The rigid ties are situated on opposite edges of each tetrahedral link and are arranged so that in successive links along torque chain 40 they lie end-to-end along two generally helical lines winding along the chain. The joints 54 between ties and spars permit mutual rotation and are advantageously made by employing hollow rigid tubes as ties 48, 50, and threading the rope forming ties 49, 51 therethrough as shown in FIG. 5. It may be noted that two arrangements of the rigid ties are possible, one forming right-handed helices and the other forming left-handed helices. The handedness of the helices chosen bears on the torque direction as will be further discussed below. The torque chain formed as described is flexible and thus can be guided into a bent configuration as by being inserted into curved pipes and the like. At the same time it is rigid in torsion and will transmit a torque. The chain is, however, torsionally rigid with respect to twisting applied in one rotational sense only, and folds up to a compact shape with the spars and rigid ties all lying alongside when twisted in the other rotational sense. The chain is rigid against a counterclockwise twist as viewed from the left when (as shown in FIG. 4) the helices formed by the rigid ties are left-handed. It may be noted that the torque chain of FIG. 4 does not need to be sustained along its axis and thus can drive a free end such as the tool 46.

The structure of FIG. 4 is adaptable for uses for the same purposes as that of FIGS. 1 - 3, as illustrated in FIG. 6.

It will be readily recognized by those skilled in the art that the invention has many applications not herein described where it is advantageous to have a structure that is flexible in bending while rigid in torsion.

I claim:

1. A torque transmitting structure extending along an axis and adapted to receive and deliver torque, said structure comprising a plurality of links connected end-to-end along said axis, each link comprising a rigid spar transverse to said axis situated at one end of the link, a second rigid spar transverse to said axis and skew to said first spar situated at a second end of the link, and four connecting ties connecting the ends of said first and second spars, the two spars and four connecting ties forming a link of generally tetrahedral form with said spars being common to adjacent links, said spars and said connecting ties being connected through linkages permitting relative rotation therebetween, at least two of said connecting ties in each link being bendable to permit their ends to be juxtaposed, said two bendable connecting ties occupying opposite edges of each tetrahedral link, said structure forming a chain which is flexible and torsionally rigid when extended along its axis and collapsible to a compact form.

2. A structure as claimed in claim 1 wherein all said ties are flexible elements capable of supporting tension forces only.

3. A structure as claimed in claim 2 including means for sustaining said chain in tension along its axis when in operation.

4. A structure as claimed in claim 3, wherein all said ties are of equal length and said means for sustaining the chain in tension is able to sustain a tension of at least $4(T/s)\sqrt{(a/s)^2 - \frac{1}{2}}$ where $a$ is the common length of the ties, $s$ is the length of the spars, and $T$ is the maximum operating torque of the chain.

5. A structure as claimed in claim 2 wherein said ties are at least as long as said spars as measured between the points of mutual connection.

6. A structure as claimed in claim 2 wherein said chain is of modular construction, the ties of each link being formed in a continuous ring with equally spaced loops along the ring, the spars having spaced hooks for engaging said loops.

7. A structure as claimed in claim 1 wherein in each link of said structure two of said ties are rigid and capable of supporting compressional loads, said rigid ties occupying opposite edges in each tetrahedral link and arranged so that in successive links along said chain they lie end-to-end along two generally helical lines winding along said chain, thereby to provide a chain which, when twisted in one sense, is torsionally rigid for transmission of torque and at the same time flexible in bending, but which is collapsible when twisted in the opposite sense.

8. A structure as claimed in claim 7 wherein said ties and said spars have the same length as measured between the points of mutual connection.

9. A structure as claimed in claim 7 including means guiding said chain into bent configuration.

10. A structure as claimed in claim 7 including means for sustaining said chain in tension along its axis in operation.

11. A structure as claimed in claim 10 including wind driven means connected to said chain to rotate it around its axis.

12. A structure as claimed in claim 1 including wind driven means connected to said chain to rotate it around its axis.

13. A structure as claimed in claim 6 including a pair of sails attached to opposite ends of one of said spars.

* * * * *